US012587385B1

(12) United States Patent
Gardella et al.

(10) Patent No.: US 12,587,385 B1
(45) Date of Patent: Mar. 24, 2026

(54) COUNTERFEIT INTEGRATED CIRCUIT DETECTOR BASED ON BLOCKCHAIN TECHNOLOGY

(71) Applicant: Allegro MicroSystems, LLC, Manchester, NH (US)

(72) Inventors: Pablo Jesús Gardella, Heidelberg (DE); Eduardo Mariani, Ciudad Autónoma de Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 52 days.

(21) Appl. No.: 18/892,958

(22) Filed: Sep. 23, 2024

(51) Int. Cl.
H04L 9/32 (2006.01)
H04L 9/00 (2022.01)

(52) U.S. Cl.
CPC .............. H04L 9/3239 (2013.01); H04L 9/50 (2022.05)

(58) Field of Classification Search
CPC ................................ H04L 9/3239; H04L 9/50
See application file for complete search history.

(56) References Cited

U.S. PATENT DOCUMENTS

| 10,839,378 | B1 * | 11/2020 | Srinivasan | ........... G06Q 20/401 |
| 11,218,324 | B2 * | 1/2022 | Wentz | ..................... H04L 9/088 |
| 11,444,769 | B2 * | 9/2022 | Wentz | ................... H04L 9/3218 |
| 11,716,617 | B2 * | 8/2023 | Wentz | ................ H04L 63/0807 |
| | | | | 713/168 |
| 11,921,835 | B2 | 3/2024 | Stainer et al. | |
| 12,254,728 | B2 * | 3/2025 | Milt | ........................ A24F 40/10 |

OTHER PUBLICATIONS

Chowdhury et al., "Low-cost Remarked Counterfeit IC Detection Using LDO Regulators;" Proceedings of IEEE International Symposium on Circuits and Systems (ISCAS); Oct. 12-14, 2020; 5 Pages.
Kessler et al., "Fakes Parts Detection;" New Techniques to ID Counterfeit ICs; Article from Printed Circuit Design & Fab / Circuits Assembly; Jun. 2010; 4 Pages.
Nakamoto, "Bitcoin: A Peer-to-Peer Electronic Cash System;" Retrieved from https://bitcoin.org/bitcoin.pdf; Oct. 2008; 9 Pages.
Wikipedia, "Sniffing Attack;" Retrieved from https://en.wikipedia.org/wiki/Sniffing_attack; Last Edited Jun. 4, 2023; 1 Page.

* cited by examiner

*Primary Examiner* — Han Yang
(74) *Attorney, Agent, or Firm* — DALY, CROWLEY, MOFFORD & DURKEE, LLP

(57) ABSTRACT

A device and method provide a visible or audible indication of whether an integrated circuit (IC) is authentic using cryptographic hashes stored on a blockchain. The IC includes a cryptographic mining circuit that creates blocks for storage in the blockchain. Each such block includes the value of a cryptographic hash function applied to a serial number unique to the IC and the hash value most recently stored in the blockchain. The necessary data are communicated between the IC and a blockchain server by an intermediary electronic authentication device, which also receives data from the server that indicate whether the second hash value equals an expected hash value computed by (or provided to) the server. The electronic authentication device accordingly provides a suitable visible or audible message to a user.

19 Claims, 6 Drawing Sheets

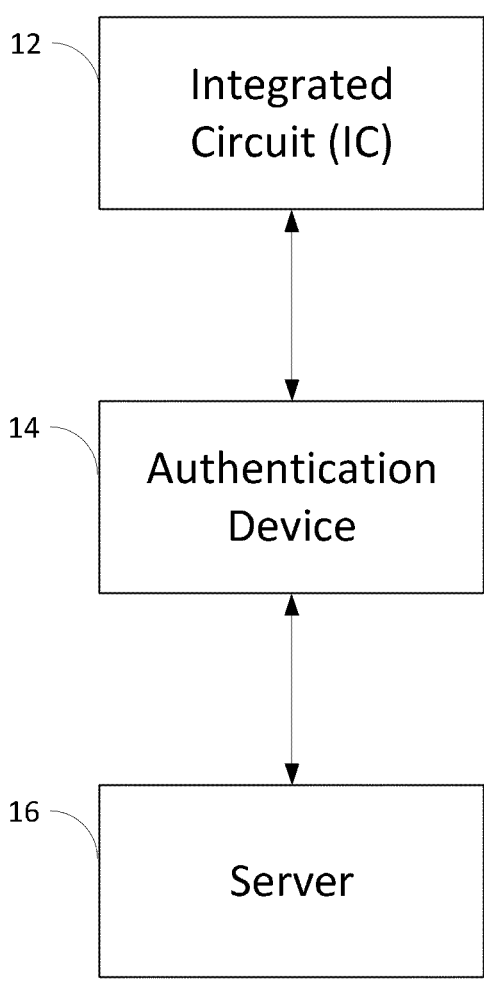
FIG. 1

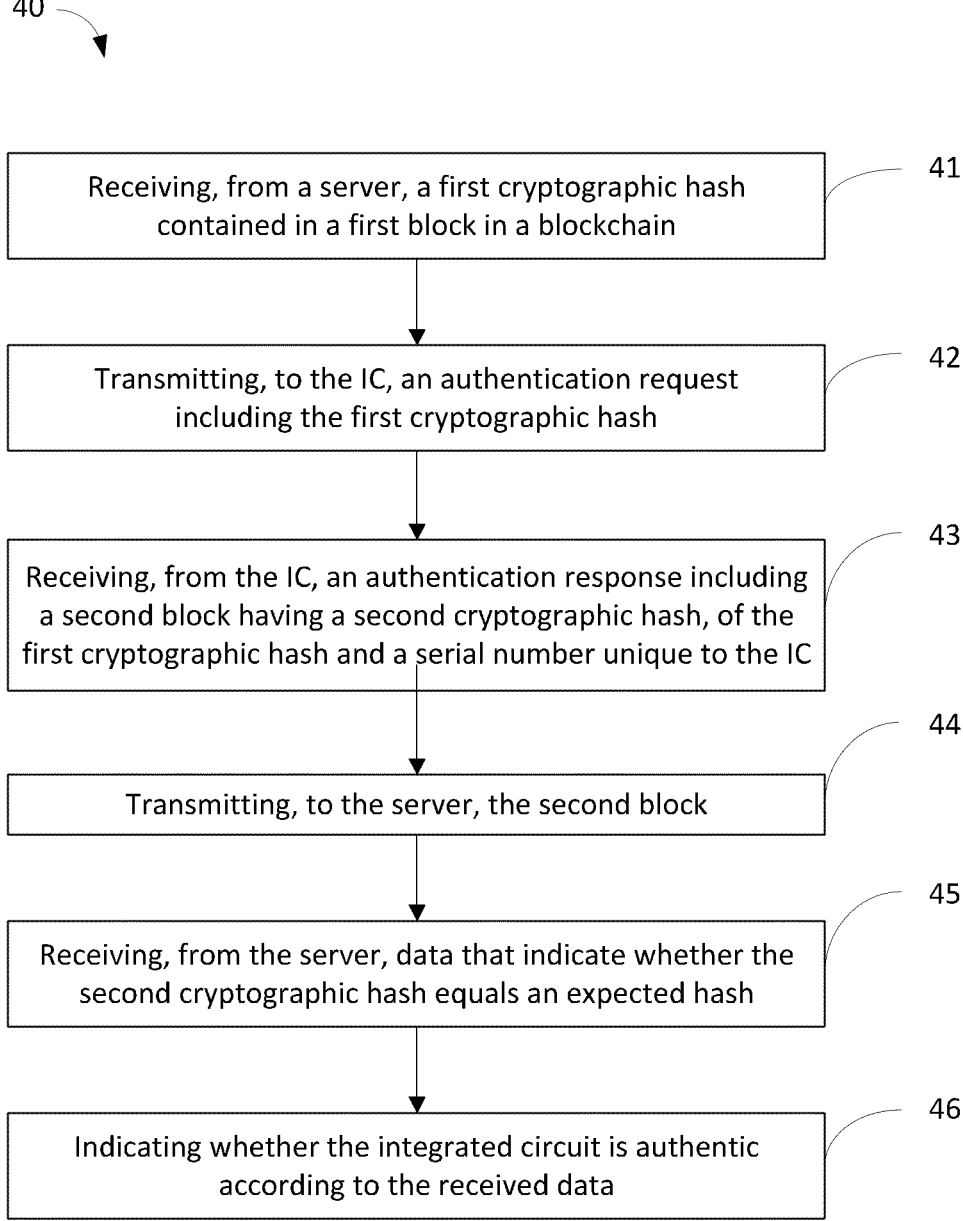

40

Receiving, from a server, a first cryptographic hash contained in a first block in a blockchain — 41

Transmitting, to the IC, an authentication request including the first cryptographic hash — 42

Receiving, from the IC, an authentication response including a second block having a second cryptographic hash, of the first cryptographic hash and a serial number unique to the IC — 43

Transmitting, to the server, the second block — 44

Receiving, from the server, data that indicate whether the second cryptographic hash equals an expected hash — 45

Indicating whether the integrated circuit is authentic according to the received data — 46

FIG. 4

COUNTERFEIT INTEGRATED CIRCUIT DETECTOR BASED ON BLOCKCHAIN TECHNOLOGY

FIELD

The disclosure pertains generally to cryptographic arrangements for secure communications, and more particularly to using blockchains to detect counterfeit integrated circuits.

BACKGROUND

Counterfeit integrated circuits (ICs) are a significant threat to the semiconductor industry, jeopardizing the integrity and reliability of electronic devices. These illicitly produced ICs infiltrate the market, often disguised as genuine components, leading to a range of detrimental consequences. Counterfeit ICs can compromise the functionality and performance of electronic systems, potentially causing malfunctions or even safety hazards. Furthermore, they undermine the trust between manufacturers and consumers, eroding confidence in the quality of semiconductor products.

The semiconductor industry faces challenges in ensuring the authenticity of components throughout the supply chain, requiring concerted efforts in authentication, traceability, and regulatory measures to mitigate the risks associated with counterfeit ICs.

There are various types of counterfeit ICs reported in the literature. Among them, recycled and remarked counterfeits are most popular and cumulatively contribute to about 80%-90% of the total counterfeits. Counterfeit IC may be defined as one of the following: An illegitimate part, or an IC which is not produced by the original component manufacturer (OCM) or produced by unauthorized third-party vendors, or an IC which does not comply to the OCM's design and performance standards, or an IC that has been used before and sold to consumer as "new", or an IC which is defective or off-specification, or an IC that has false markings.

SUMMARY OF DISCLOSED EMBODIMENTS

Disclosed embodiments secure the integrity of integrated circuits, using blockchain technology adhering to the most stringent cryptographic protocols, to ensure a distinctive and exceptionally secure authenticity signature. This signature facilitates a secure link between integrated circuits (ICs) and a device that requests its identification, known herein as a "counterfeit detector" or "authentication device". Counterfeit detectors may be used by any person, such as a product service technician or the manufacturer, to verify the authenticity of an integrated circuit in accordance with embodiments.

The disclosed architecture leverages the strengths of public-private key cryptography to create a signature that is inherently secure against eavesdropping attacks and highly resistant to reverse engineering efforts. This marks a significant improvement over current methods, which rely on storing serial numbers in concealed memory sectors and are more vulnerable to compromise. In addition to that, with the disclosed architecture, embodiments can provide an immediate notification to the manufacturer describing when and where a counterfeit IC is detected.

This process not only secures the supply chain but also provides a clear and auditable trail of authenticity checks, which is essential for maintaining trust with customers and stakeholders. The use of blockchain technology in this manner showcases a proactive approach to combating the ever-growing threat of counterfeit electronics in the industry.

Thus, a first embodiment is an integrated circuit comprising: a circuit configured to perform a desired function; a processor circuit coupled to the circuit configured to perform a desired function; a data communications circuit coupled to the processor circuit and configured to receive data from, and transmit data to, an electronic authentication device; and a cryptographic mining circuit coupled to the processor circuit and configured to implement a hashing algorithm.

The processor circuit is configured to respond to receipt, from the electronic authentication device using the data communications circuit, of data including a first cryptographic hash contained in a blockchain, by performing two actions. The first action is causing the cryptographic mining circuit to produce a second cryptographic hash for inclusion in the blockchain by applying the hashing algorithm to a combination of the first cryptographic hash and a serial number that is unique to the integrated circuit. And the second action is causing the data communications circuit to transmit, to the electronic authentication device, data including the second cryptographic hash, thereby enabling the electronic authentication device to determine, using the blockchain, whether the integrated circuit is authentic.

In some embodiments, the circuit configured to perform a desired function comprises a magnetic field sensor.

In some embodiments, the processor circuit comprises an application specific integrated circuit, a microprocessor having associated program memory, or a field programmable gate array.

In some embodiments, the data communications circuit comprises a network interface controller.

In some embodiments, the data communications circuit comprises a loop antenna for providing near field communications between the integrated circuit and the electronic authentication device.

In some embodiments, the cryptographic mining circuit is configured to implement the SHA-256 hashing algorithm.

Some embodiments further comprise the electronic authentication device.

Another embodiment is a device for indicating whether an integrated circuit is authentic. The device includes a processor circuit; a first data communications circuit coupled to the processor circuit and configured to receive data from, and transmit data to, a server; a second data communications circuit coupled to the processor circuit and configured to receive data from, and transmit data to, the integrated circuit; and an indicator.

The processor circuit is configured to authenticate the integrated circuit by performing a number of actions. One action is receiving, from a server using the first data communications circuit, a first cryptographic hash contained in a blockchain. Another action is transmitting, to the integrated circuit using the second data communications circuit, an authentication request including the first cryptographic hash. Another action is receiving, from the integrated circuit using the second data communications circuit, an authentication response including a second cryptographic hash of a combination of the first cryptographic hash and a serial number unique to the integrated circuit. Another action is transmitting the second cryptographic hash to the server using the first data communications circuit. Another action is receiving, from the server using the first data communications circuit, data that indicate whether the second cryptographic hash equals an expected cryptographic hash. And another action is causing the indicator to indicate whether the integrated circuit is authentic according to the received data.

In some embodiments, the processor circuit comprises an application specific integrated circuit, a microprocessor having associated program memory, or a field programmable gate array.

In some embodiments, the first data communications circuit or the second data communications circuit comprises a network interface controller.

In some embodiments, the second data communications circuit comprises a loop antenna for providing near field communications between the integrated circuit and the device.

In some embodiments, the first cryptographic hash, the second cryptographic hash, and the expected cryptographic hash each were computed using the SHA-256 hashing algorithm.

In some embodiments, further comprising the integrated circuit, wherein the second data communications circuit comprises a wired data bus.

In some embodiments, the indicator comprises an electronic video display, or an indicator light, or a speaker, or any combination of these.

Another embodiment is a method of indicating whether an integrated circuit is authentic. The method first comprises receiving, from a server using a first data communications circuit, a first cryptographic hash contained in a blockchain. The method next comprises transmitting, to the integrated circuit using a second data communications circuit, an authentication request including the first cryptographic hash. The method then comprises receiving, from the integrated circuit using the second data communications circuit, an authentication response including a second cryptographic hash of a combination of the first cryptographic hash and a serial number unique to the integrated circuit. The method further comprises transmitting the second cryptographic hash to the server using the first data communications circuit. The method next includes receiving, from the server using the first data communications circuit, data that indicate whether the second cryptographic hash equals an expected cryptographic hash. The method concludes with indicating whether the integrated circuit is authentic according to the received data.

In some embodiments, receiving the first cryptographic hash comprises receiving using the Internet.

In some embodiments, transmitting the authentication request comprises transmitting using near field communications with the integrated circuit.

In some embodiments, the first cryptographic hash, the second cryptographic hash, and the expected cryptographic hash each were computed using the SHA-256 hashing algorithm.

In some embodiments, indicating comprises indicating using an electronic video display, or an indicator light, or a speaker, or any combination of these.

It is appreciated that the concepts, techniques, and structures disclosed herein may be embodied in other ways, and that the above summary of disclosed embodiments is thus meant to be illustrative rather than comprehensive or limiting. In particular, individual elements of different embodiments described herein may be combined to form other embodiments not specifically set forth above. Various elements, which are described in the context of a single embodiment, also may be provided in other embodiments separately, or in any suitable sub-combination. Moreover, other embodiments not specifically described herein also may be within the scope of the claims set forth below.

DESCRIPTION OF THE SEVERAL VIEWS OF THE DRAWINGS

The manner and process of making and using the disclosed embodiments may be appreciated by reference to the drawings, in which:

FIG. 1 schematically shows a system in which the disclosed concepts, techniques, and structures may be embodied;

FIG. 4 is a flow diagram for a method of indicating whether an integrated circuit is authentic in accordance with an embodiment;

DETAILED DESCRIPTION OF EMBODIMENTS

In this specification, including the appended claims, the following quoted terms shall have the indicated meanings that are not limited to specific embodiments, except where expressly indicated otherwise:

"Sniffing attack" in context of network security, means theft or interception of data by recording the network traffic using a packet sniffer (an application aimed at capturing network packets). When data is transmitted across networks, if the data packets are not encrypted, the data within the network packet can be read using a sniffer. Using a sniffer application, an attacker can analyze the network and gain information to eventually cause the network to crash or to become corrupted, or read the communications happening across the network.

An "eavesdropping attack" occurs when a hacker intercepts, deletes, or modifies data that is transmitted between two devices. Eavesdropping, also known as sniffing or snooping, relies on unsecured network communications to access data in transit between devices.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter.

FIG. 1 schematically shows a system 10 in which the disclosed concepts, techniques, and structures may be embodied. The system 10 includes an integrated circuit (IC) 12, an electronic authentication device 14, and a server 16. The IC 12 is shown in more detail in FIG. 2 and described below, and is the component whose authenticity is being verified. The IC 12 originates the proof of authenticity that a user seeks to confirm.

The electronic authentication device 14 is shown in more detail in FIG. 3 and described below. The electronic authentication device 14 is an intermediary agent, engaging with the IC 12 to obtain the authenticity proof. It also connects to the server 16 to verify this proof, and thus may require a live Internet connection.

The server 16 is known in the art, and provides access to a blockchain service; i.e., a ledger that records transactions in linear chains of records called "blocks". For purposes of the present disclosure, the ledger records all requests for authenticity verification of integrated circuits, and acts as the authoritative source against which the proof of authenticity is checked. In some embodiments, the server 16 is privately hosted, so that only authorized authentication devices 14 may record transactions and only authorized users have access to recorded transactions. This arrangement is particularly advantageous for reasons described below.

Figure 2:
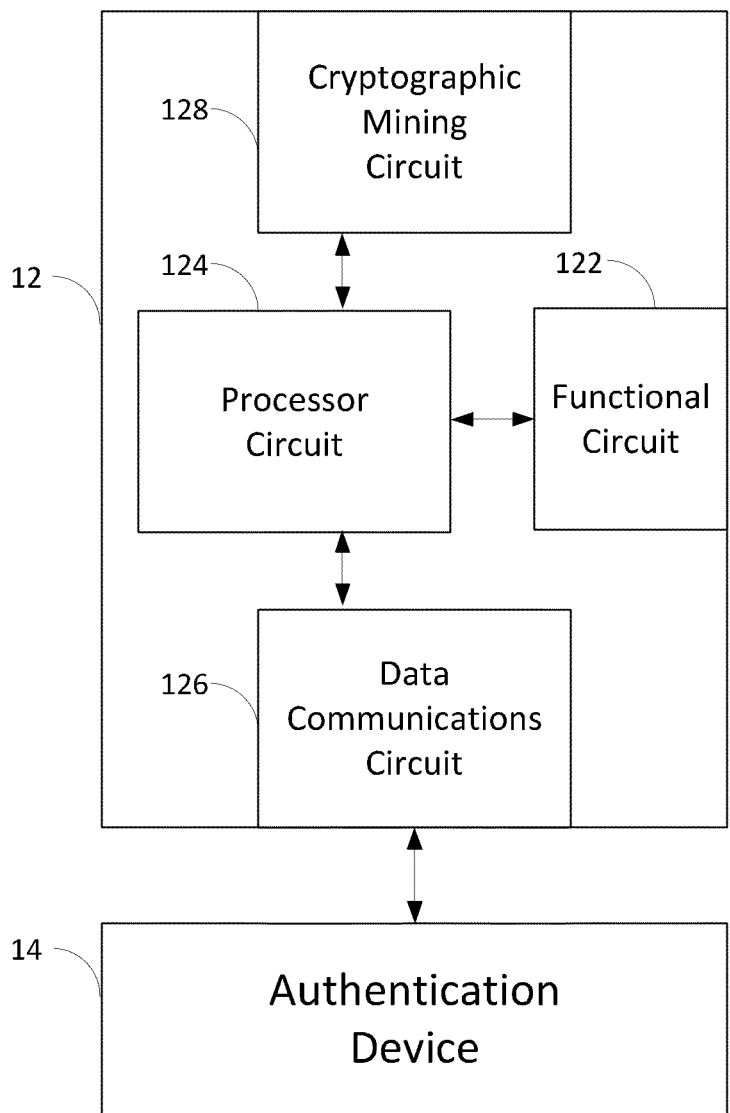
FIG. 2 schematically shows relevant components of an integrated circuit (IC) in accordance with an embodiment.

FIG. 2 schematically shows relevant components of the integrated circuit (IC) 12 in accordance with an embodiment, and their respective relationships. The IC 12 includes a "functional" circuit 122; i.e., a circuit that is configured to perform a desired function. For purposes of concreteness, the functional circuit 122 may comprise a sensor, such as a magnetic field sensor. However, the desired function is not limited by the scope of this disclosure; rather, a primary advantage of disclosed embodiments is to ensure that integrated circuits that perform the desired function (whatever it may be) are authentic and not counterfeit. Thus, the functional circuit 122 may be a circuit for performing any desired function that is manufactured in accordance with known techniques for producing integrated circuits.

The IC 12 also includes a computing processor. 124 coupled to the functional circuit 122. The processor circuit 124 may provide manipulation of signals output by the functional circuit 122, e.g., to convert analog signals to digital signals using an analog-to-digital converter (ADC) or for other purposes. The processor circuit 124 may be implemented as, e.g., an application specific integrated circuit (ASIC), which can be an analog ASIC or a digital ASIC, as a microprocessor with associated program memory, as a discrete electronic circuit which can be analog or digital, and/or in special purpose logic circuitry (e.g., a field programmable gate array (FPGA)).

The IC 12 also includes a data communications circuit 126 coupled to the processor circuit 124 and configured to receive data from, and transmit data to, external devices (including the electronic authentication device 14). The data communications circuit 126 is used to convey data to other devices according to a data communications protocol, such as the Serial Peripheral Interface (SPI) or the Controller Area Network (CAN) bus protocol. These data may include output signals from the functional circuit 122, subsequently processed by the processor circuit 124. In accordance with disclosed embodiments, the data also include authentication data used by the other device (in this case, the electronic authentication device 14) to authenticate the IC 12. The data communications circuit 126 may be implemented as a wired or wireless network interface controller (NIC) or other device known in the art for interfacing between a computing processor and a data communications network. Thus, for example, the data communications circuit 126 may include a loop antenna for providing near field communications (NFC) between the IC 12 and the electronic authentication device 14.

The IC 12 also includes a cryptographic mining circuit 128 coupled to the processor circuit and configured to implement a hashing algorithm. In this connection, a "hashing algorithm" is a mathematical computation that can be evaluated in one direction only (i.e., inputs to outputs). That is, given the outputs of a hashing algorithm, it is computationally infeasible to recover the inputs. Many such hashing algorithms are known in the art, such as the so-called SHA-256 hashing algorithm. For purposes of the present disclosure, any such algorithms may be used in embodiments, and the cryptographic mining circuit 128 may be implemented as any circuit capable of repeatedly and reliably performing the hashing algorithm on its inputs.

In accordance with disclosed embodiments, the integrated circuit 12 performs a proof of authenticity as follows. First, its processor circuit 124 receives a request to establish a data channel from the electronic authentication device 14, using the data communications circuit 126. Optionally, the processor circuit 124 determines whether to respond to the request, e.g., to ensure that it communicates only with an authorized electronic authentication device. In any event, the processor circuit 124 may acknowledge this request by sending a response to the electronic authentication device 14, completing the necessary steps to establish a data channel.

Next, the processor circuit 124 receives, from the electronic authentication device 14 using the data communications circuit 126, data including a first cryptographic hash contained in a blockchain. The details of how the electronic authentication device 14 obtained this cryptographic hash are not important from the perspective of the IC 12. However, for the purposes of concreteness, the electronic authentication device 14 may have obtained the cryptographic hash from a blockchain accessible by the server 16 as the most recently-stored hash in the chain.

In response to receiving this hash, the processor circuit 124 responds by taking two actions. First, it causes the cryptographic mining circuit 128 to perform a cryptographic mining process to produce a second cryptographic hash (e.g., for inclusion in a new block in the blockchain). The cryptographic mining circuit 128 does this by applying its hashing algorithm to a combination of the first cryptographic hash and a serial number that is unique to the IC 12. The serial number may have been, for example, assigned at the factory in which the IC 12 was manufactured, and may be stored in a read-only memory (ROM, not shown) of the IC 12. The combination may be any data that include both specified input values, and may include additional input values such as a globally-shared secret key, timestamp, or other data used to ensure security. However, for purposes of illustration, the combination is taken to be a concatenation of the first hash and the serial number.

The second action taken by the processor circuit 124 is causing the data communications circuit 126 to transmit, to the electronic authentication device 14, data including the second cryptographic hash. At this stage of the process, the work done by the processor circuit 124 to authenticate the IC 12 is finished. However, the electronic authentication device 14 may subsequently communicate the second cryptographic hash to the server 16 to enable the electronic authentication device 14 to determine, using the blockchain, whether the IC 12 is authentic, as described below in more detail.

It is appreciated that, in some embodiments, the integrated circuit 12 and the electronic authentication device 14 may comprise a single device (i.e., either a combined integrated circuit or a multifunction device having the integrated circuit and the electronic authentication device as subcomponents). Therefore, the depiction in the Figures of the integrated circuit 12 and the electronic authentication device 14 as separate elements should not be viewed as necessarily limiting their physical structures.

Figure 3:
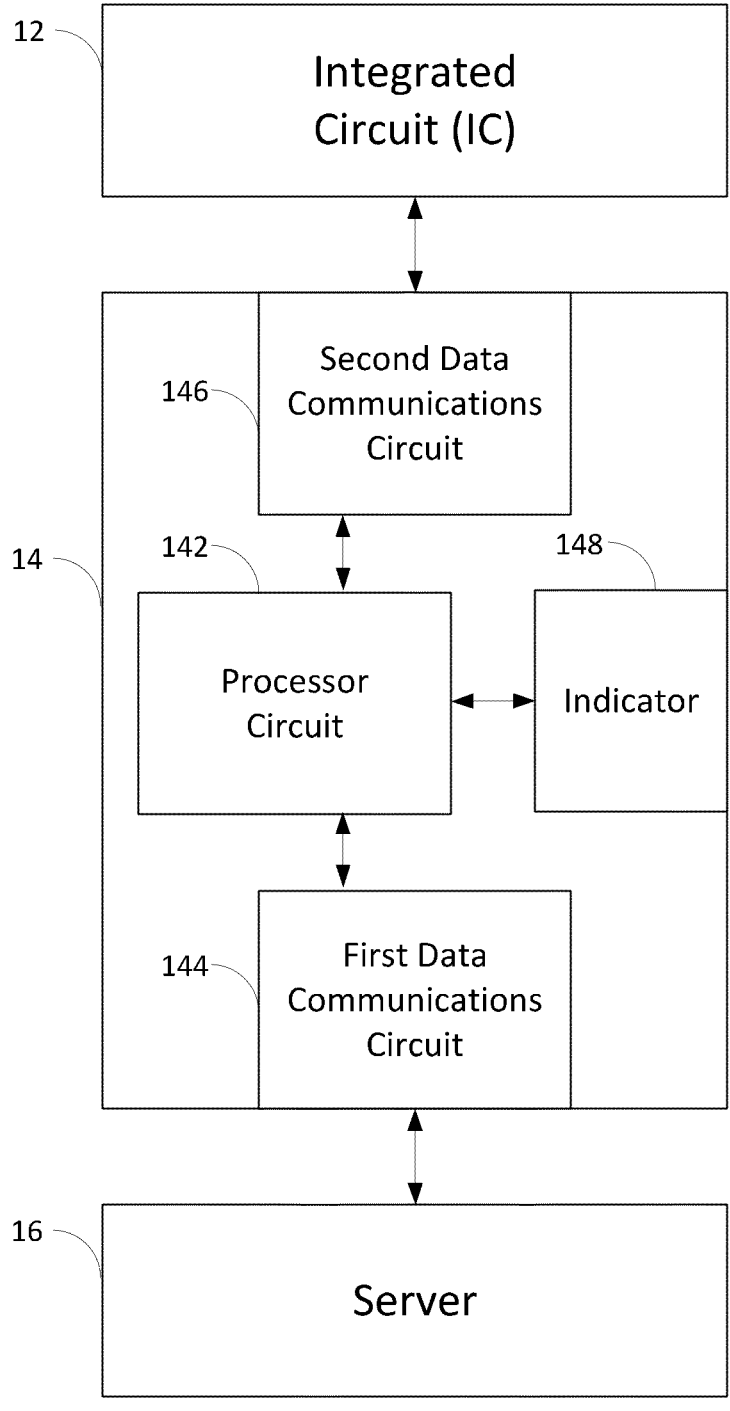
FIG. 3 schematically shows relevant components of an authentication device for indicating whether an integrated circuit is authentic in accordance with an embodiment.

FIG. 3 schematically shows relevant components of an electronic authentication device 14 for indicating whether an integrated circuit 12 is authentic in accordance with an embodiment. The electronic authentication device 14 includes a processor circuit 142. The processor circuit 142 may be implemented as, e.g., an application specific integrated circuit (ASIC), which can be an analog ASIC or a digital ASIC, as a microprocessor with associated program memory, as a discrete electronic circuit which can be analog or digital, and/or in special purpose logic circuitry (e.g., a field programmable gate array (FPGA)).

The electronic authentication device 14 also includes a first data communications circuit 144 coupled to the processor circuit 142 and configured to receive data from, and transmit data to, the server 16. The first data communications circuit 144 may be used to convey data to devices other than the electronic authentication device 14, but especially to the server 16, according to a data communications protocol such as the well-known TCP/IP and HTTPS protocols or other Internet Standard protocols.

The electronic authentication device 14 also includes a second data communications circuit 146 coupled to the processor circuit 142 and configured to receive data from, and transmit data to, the integrated circuit 12. The second data communications circuit 146 is used to convey data to the IC 12 according to a data communications protocol, such as the Serial Peripheral Interface (SPI) or the Controller Area Network (CAN) bus protocol. The second data communications circuit 146 may be implemented as a wired or wireless network interface controller (NIC) or other device known in the art for interfacing between a computing processor and a data communications network. Thus, for example, the second data communications circuit 146 may include a loop antenna for providing near field communications (NFC) between the IC 12 and the electronic authentication device 14.

The electronic authentication device 14 also includes an indicator 148 for indicating whether the integrated circuit 12 is authentic. The indicator 148 may include an electronic video display, or an indicator light, or a speaker, or any combination of these to provide a visible or audible signal to a human operator of the electronic authentication device 14. Alternately, the indicator 148 may be a signal line that provides the indication to another electronic device, such as a testing robot at a factory.

In accordance with disclosed embodiments, the electronic authentication device 14 performs a proof of authenticity as follows. Several of the following steps are complementary to those described above in connection with the IC 12.

The processor circuit 142 requests, then subsequently receives, from the server 16 using the first data communications circuit 144, a first cryptographic hash contained in a blockchain.

The processor circuit 142 also transmits a request to establish a data channel to the IC 12, using the second data communications circuit 146. The IC 12 acknowledges this request by sending a response to the electronic authentication device 14, completing the necessary steps to establish a data channel. It is appreciated that these first two steps may be performed in any order, or in parallel.

Next, the processor circuit 142 transmits, to the integrated circuit 12 using the second data communications circuit 146, an authentication request including the first cryptographic hash that it received from the server. The processor circuit 142 subsequently receives, from the integrated circuit 12 using the second data communications circuit 146, an authentication response including a second cryptographic hash. As indicated above, the second cryptographic hash is a function of a combination of the first cryptographic hash and a serial number unique to the integrated circuit 12. In some embodiments, this hash cannot be computed by the electronic authentication device 14.

Now possessing the authentication data proffered by the IC 12, the processor circuit 142 requests confirmation of authenticity by transmitting the second cryptographic hash to the server 16 using the first data communications circuit 144. The processor circuit 142 subsequently receives, from the server 16 using the first data communications circuit 144, data that indicate whether the second cryptographic hash equals an expected cryptographic hash, and, thus, that the IC 12 is authentic. The server 16 may compute the expected cryptographic hash itself, or obtain it from another server. In any event, the expected cryptographic hash is computed using the same hashing algorithm as that used to compute the second cryptographic hash, using the same inputs (i.e., at least the hash stored in the last block of the blockchain, and the unique serial number of the IC 12).

Because hashing algorithms are deterministic and repeatable, both computations should result in the same hash value, thereby indicating that the IC 12 is in possession of the proffered serial number and that its cryptographic mining circuit is operating normally. Each of the cryptographic hashes (i.e., the first, second, and expected cryptographic hashes) each may be computed using the same hashing algorithm, e.g., SHA-256.

Thus, equality of the two hash values demonstrates that the IC 12 is authentic. If this is so, then the server 16 may cause the blockchain to store a new block containing the second cryptographic hash, in preparation for the next authentication request. If not, then the server 16 may trigger an alert that the attempted authentication has failed, immediately informing both the manufacturer and the user of the electronic authentication device 14. In either case, the processor circuit 142 causes the indicator 148 to indicate whether the integrated circuit is authentic according to the received data.

A primary advantage of employing a blockchain system lies in the unique hash that each block possesses. This uniqueness ensures that every interaction with integrated circuits is distinct, which in turn fortifies the architecture against sniffing attacks. Sniffing attacks rely on the predictability of communication to intercept and decode the transmitted data. However, by using a blockchain where each block's hash is different, the data exchanged with the ICs varies each time an authentication request is made, making it exceedingly difficult for unauthorized entities to anticipate, capture, or replicate the communication. This variability is a critical security feature that significantly strengthens the system's defense against such invasive attacks, ensuring the integrity and confidentiality of the data being transmitted. This approach not only enhances security but also instills confidence in the authenticity of the ICs, as the verification process becomes more dynamic and less susceptible to being compromised.

As noted above, it is appreciated that, in some embodiments, the integrated circuit 12 and the electronic authentication device 14 may comprise a single device (i.e., either a combined integrated circuit or a multifunction device having the integrated circuit and the electronic authentication device as subcomponents). Moreover, in such embodiments, the data communication circuit 126 and the second data communications circuit 146 may comprise a wired data bus.

FIG. 4 is a flow diagram for a method 40 of indicating whether an integrated circuit is authentic in accordance with an embodiment. The integrated circuit may be, e.g., IC 12, and the method 40 may be performed by the electronic authentication device 14, or by other hardware and/or software suitable to carry out all of its processes 41-46.

The method 40 includes a process 41 of receiving, from a server using a first data communications circuit, a first cryptographic hash contained in a blockchain. The server may be server 16 which has access to the blockchain, and the first data communications circuit may be circuit 144. Communications by the first data communications circuit, including reception of the first cryptographic hash, may use the Internet according to an Internet Standard protocol.

The method 40 also includes a process 42 of transmitting, to the integrated circuit using a second data communications circuit, an authentication request including the first cryptographic hash. The integrated circuit may be IC 12, and the second data communications circuit may be circuit 146. Communications by the second data communications circuit, including transmission of the authentication request, may use near field communications (NFC) with the integrated circuit. The processes 41 and 42 may be carried out sequentially or simultaneously.

The method 40 next includes a process 43 of receiving, from the integrated circuit using the second data communications circuit, an authentication response including a second cryptographic hash of a combination of the first cryptographic hash and a serial number unique to the integrated circuit.

The method 40 next includes a process 44 of transmitting the second cryptographic hash to the server using the first data communications circuit. The method 40 next includes a process 45 of receiving, from the server using the first data communications circuit, data that indicate whether the second cryptographic hash equals an expected cryptographic hash. The first cryptographic hash, the second cryptographic hash, and the expected cryptographic hash each may be computed using the same hashing algorithm, including the SHA-256 hashing algorithm.

The method 40 next includes a process 46 of indicating whether the integrated circuit is authentic according to the received data. Indicating may be performed by the indicator 148, and may include using an electronic video display, or an indicator light, or a speaker, or any combination of these.

This verification sequence ensures that each proof of authenticity is unique and traceable, providing a secure and tamper-proof method for authenticating ICs. The blockchain's inherent characteristics of immutability and transparency make it an ideal platform for such a critical security application. By leveraging the blockchain, a company can maintain a high level of security against counterfeiting, ensuring that only genuine products are in circulation.

Figure 5:
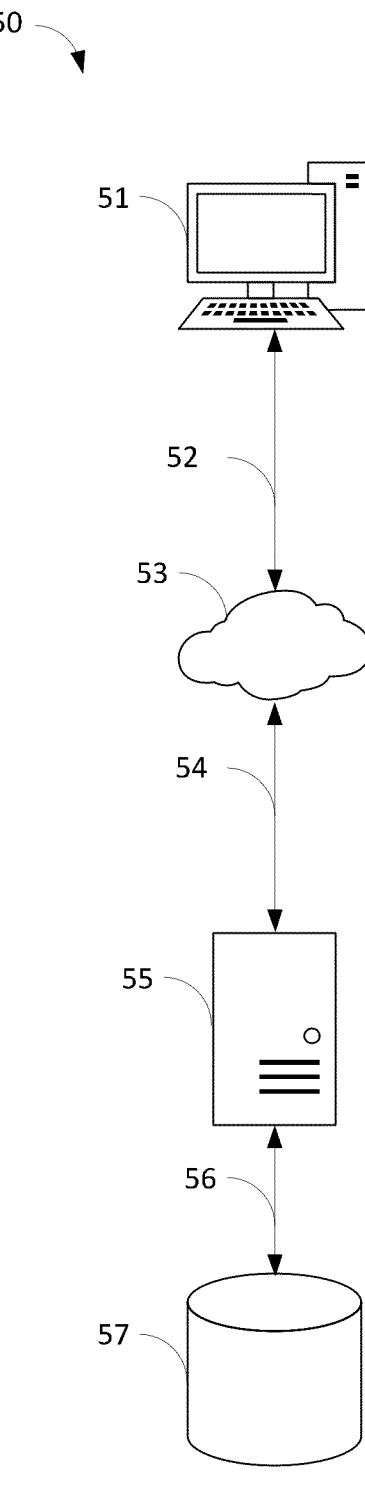
FIG. 5 schematically shows a typical client-server system in which the disclosed concepts, structures, and techniques may be advantageously embodied.

FIG. 5 schematically shows a typical client-server system in which the disclosed concepts, structures, and techniques may be advantageously embodied. In accordance with client-server principles, the system 50 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, the system 50 includes a client device 51. The client device 51 is illustrated as a desktop computer, but may be any electronic device known in the art, including without limitation a laptop computer, tablet computer, smartphone, embedded system, or any other device capable of transmitting and receiving data, and requesting that another electronic device perform a computation.

The client device 51 is coupled, via a data link 52, to a data network 53. The data link 52 is any combination of hardware or software suited for communicating data between the client device 51 and other electronic devices via the data network 53. The data link 52 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

The data network 53 is any combination of hardware or software suited for communicating data between electronic devices via data links. The data network 53 may be, for example, a local area network ("LAN"), a wide area network ("WAN"), a metropolitan area network ("MAN"), a virtual private network ("VPN"), the Internet, or any other type of data network.

It is appreciated that a data network 53 operates to mediate data communication between multiple electronic devices. Thus, the depiction of only a single client device 51 in FIG. 5 is merely illustrative, and a typical system 50 may have any number of client devices coupled for data communication using corresponding data links to the data network 53. It is also appreciated that the data network 53 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

The data network 53 allows the client device 51 to communicate with a server device 55, which is coupled to the data network 53 using a data link 54. The data link 54 is any combination of hardware or software suited for communicating data between the server device 55 and other electronic devices via the data network 53. The server device 55 may be any electronic device known in the art that is capable of transmitting and receiving data, and performing a computation on behalf of another electronic device.

Again, the data network 53 operates to mediate data communication between multiple electronic devices. Thus, the depiction of only a single server device 55 in FIG. 5 is merely illustrative, and a typical system 50 may have any number of server devices coupled for data communication using corresponding data links to the data network 53. In particular, to provide simultaneous service to large numbers of client devices, a particular computation (or type of computation, such as rendering a web page) may be allocated to one of multiple server devices using a load balancer or other device. It is further appreciated that the server device 55, along with additional server devices if required, may provide well-defined operations known as "services" according to a service-oriented architecture ("SOA"), as those terms are known in the art.

It is appreciated in accordance with client-server principles that the designation of device 51 as the "client device" and device 55 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of the system 50, namely that the client device 51 is the device requesting that a particular computation be performed on behalf of a user thereof, and that the server device 55 operates a "service" to perform the computation and communicate the results to the client device 51. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 5 shows the server device 55 coupled, via a storage link 56, to a data storage device 57. The data storage device 57 may be a database, file system, volatile or non-volatile memory, network attached storage ("NAS"), storage area network ("SAN"), or any other hardware or software that is capable of storing data used by a server device 55 or a service executing thereon. The storage link 56 may be any hardware or software capable of communicating data between the server device 55 and the data storage device 57. It is appreciated that, where more than one server device 55 is present, multiple server devices may communicate with the same data storage device 57 to provide data sharing between the server devices.

It is appreciated that a requested computation may be done in several parts, thereby requiring the system 50 to retain an intermediate computational state between requests. If the services provided by the server device 55 do not store any such state (for example, to simplify their design), then the client device 51 must supply all state with each request. This type of communication may be provided using the representational state transfer ("REST") client-server architecture. In addition to being a stateless client-server architecture, REST systems permit responses to requests with identical inputs to be cached to improve response time; permit layering of services, thereby multiplying available functionality; permit services to require clients to perform some computation locally to improve performance; and provide a uniform interface for all client devices.

Figure 6:
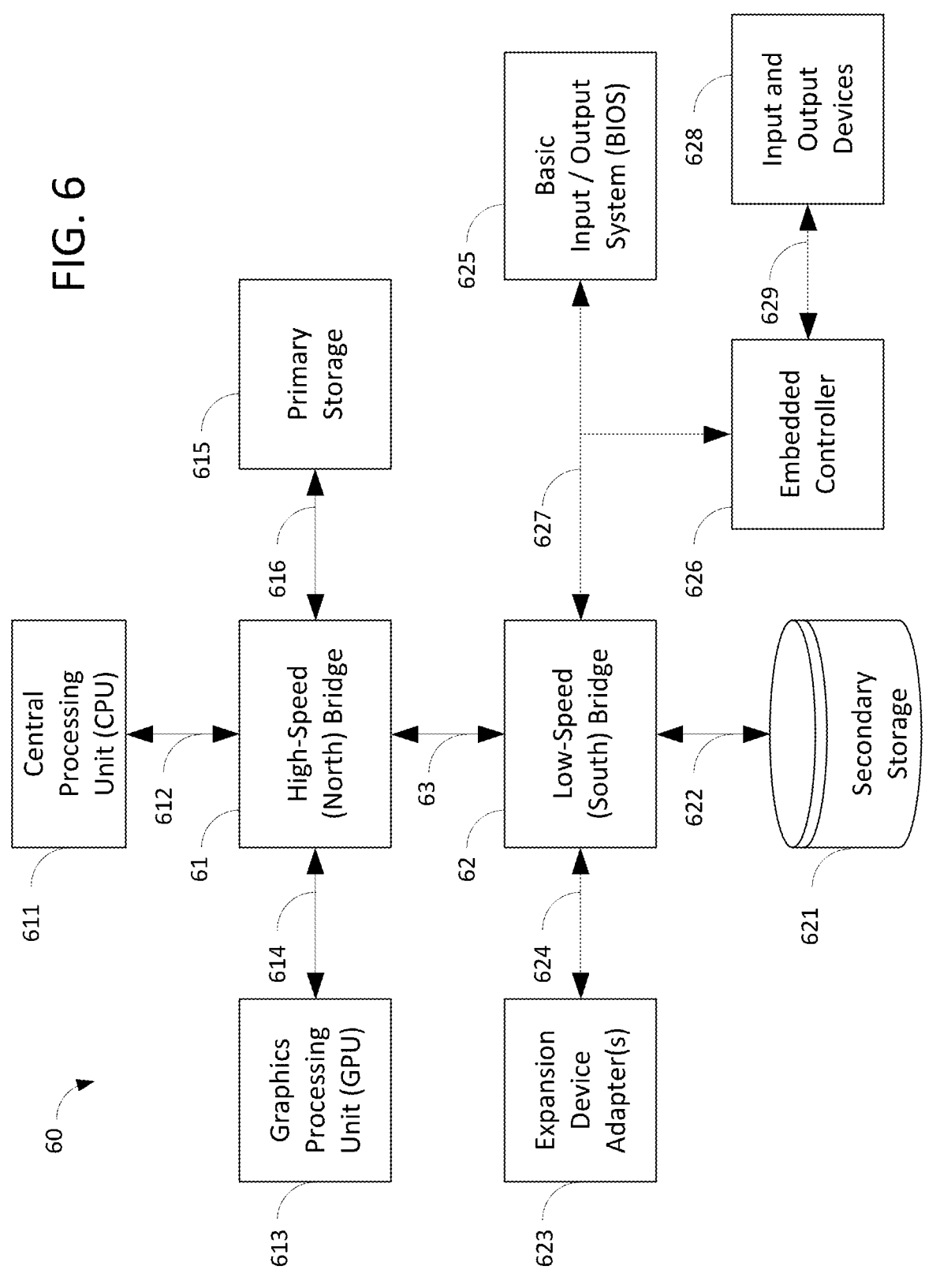
FIG. 6 schematically shows relevant physical components of a computer that may be used to implement some of the structures described herein.

FIG. 6 schematically shows relevant physical components of a computer 60 that may be used to embody the concepts, structures, and techniques disclosed herein, and in particular those of the electronic authentication device 14 and/or the server 16. Generally, the computer 60 has many functional components that communicate data with each other using data buses. The functional components of FIG. 6 are physically arranged based on the speed at which each must operate, and the technology used to communicate data using buses at the necessary speeds to permit such operation.

Thus, the computer 60 is arranged as high-speed components and buses 611 to 616 and low-speed components and buses 621 to 629. The high-speed components and buses 611 to 616 are coupled for data communication using a high-speed bridge 61, also called a "northbridge," while the low-speed components and buses 621 to 629 are coupled using a low-speed bridge 62, also called a "southbridge."

The computer 60 includes a central processing unit ("CPU") 611 coupled to the high-speed bridge 61 via a bus 612. The CPU 611 is electronic circuitry that carries out the instructions of a computer program. As is known in the art, the CPU 611 may be implemented as a microprocessor; that is, as an integrated circuit ("IC"; also called a "chip" or "microchip"). In some embodiments, the CPU 611 may be implemented as a microcontroller for embedded applications, or according to other embodiments known in the art.

The bus 612 may be implemented using any technology known in the art for interconnection of CPUs (or more particularly, of microprocessors). For example, the bus 612 may be implemented using the HyperTransport architecture developed initially by AMD, the Intel QuickPath Interconnect ("QPI"), or a similar technology. In some embodiments, the functions of the high-speed bridge 61 may be implemented in whole or in part by the CPU 611, obviating the need for the bus 612.

The computer 60 includes one or more graphics processing units (GPUs) 613 coupled to the high-speed bridge 61 via a graphics bus 614. Each GPU 613 is designed to process commands from the CPU 611 into image data for display on a display screen (not shown). In some embodiments, the CPU 611 performs graphics processing directly, obviating the need for a separate GPU 613 and graphics bus 614. In other embodiments, a GPU 613 is physically embodied as an integrated circuit separate from the CPU 611 and may be physically detachable from the computer 60 if embodied on an expansion card, such as a video card. The GPU 613 may store image data (or other data, if the GPU 613 is used as an auxiliary computing processor) in a graphics buffer.

The graphics bus 614 may be implemented using any technology known in the art for data communication between a CPU and a GPU. For example, the graphics bus 614 may be implemented using the Peripheral Component Interconnect Express ("PCI Express" or "PCIe") standard, or a similar technology.

The computer 60 includes a primary storage 615 coupled to the high-speed bridge 61 via a memory bus 616. The primary storage 615, which may be called "main memory" or simply "memory" herein, includes computer program instructions, data, or both, for use by the CPU 611. The primary storage 615 may include random-access memory ("RAM"). RAM is "volatile" if its data are lost when power is removed, and "non-volatile" if its data are retained without applied power. Typically, volatile RAM is used when the computer 60 is "awake" and executing a program, and when the computer 60 is temporarily "asleep", while non-volatile RAM ("NVRAM") is used when the computer 60 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 616 may be implemented using any technology known in the art for data communication between a CPU and a primary storage. The memory bus 616 may comprise an address bus for electrically indicating a storage address, and a data bus for transmitting program instructions and data to, and receiving them from, the primary storage 615. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 60 may use up to $8*2^{32}=32$ gigabytes (GB) of primary storage 615. In this example, the memory bus 616 will have a total width of 64+32=66 bits. The computer 60 also may include a memory controller circuit (not shown) that converts electrical signals received from the memory bus 616 to electrical signals expected by physical pins in the primary storage 615, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 611, the graphics processing units 613, the primary storage 615, and the high-speed bridge 61, or any combination thereof, as a single integrated circuit. In such embodiments, buses 612, 614, 616 may form part of the same integrated circuit and need not be physically separate. Other designs for the computer 60 may embody the functions of the CPU 611, graphics processing units 613, and the primary storage 615 in different configurations, obviating the need for one or more of the buses 612, 614, 616.

The depiction of the high-speed bridge 61 coupled to the CPU 611, GPU 613, and primary storage 615 is merely exemplary, as other components may be coupled for communication with the high-speed bridge 61. For example, a network interface controller ("NIC" or "network adapter") may be coupled to the high-speed bridge 61, for transmitting and receiving data using a data channel. The NIC may store data to be transmitted to, and received from, the data channel in a network data buffer.

The high-speed bridge 61 is coupled for data communication with the low-speed bridge 62 using an internal data bus 63. Control circuitry (not shown) may be required for transmitting and receiving data at different speeds. The internal data bus 63 may be implemented using the Intel Direct Media Interface ("DMI") or a similar technology.

The computer 60 includes a secondary storage 621 coupled to the low-speed bridge 62 via a storage bus 622. The secondary storage 621, which may be called "auxiliary memory", "auxiliary storage", or "external memory" herein, stores program instructions and data for access at relatively low speeds and over relatively long durations. Since such durations may include removal of power from the computer 60, the secondary storage 621 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 622 may be implemented using any technology known in the art for data communication between a CPU and a secondary storage and may include a host adaptor (not shown) for adapting electrical signals from the low-speed bridge 62 to a format expected by physical pins on the secondary storage 621, and vice versa. For example, the storage bus 622 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 60 also includes one or more expansion device adapters 623 coupled to the low-speed bridge 62 via a respective one or more expansion buses 624. Each expansion device adapter 623 permits the computer 60 to communicate with expansion devices (not shown) that provide additional functionality. Such additional functionality may be provided on a separate, removable expansion card, for example an additional graphics card, network card, host adaptor, or specialized processing card.

Each expansion bus 624 may be implemented using any technology known in the art for data communication between a CPU and an expansion device adapter. For example, the expansion bus 624 may transmit and receive electrical signals using a Peripheral Component Interconnect ("PCI") standard, a data networking standard such as an Ethernet standard, or a similar technology.

The computer 60 includes a basic input/output system ("BIOS") 625 and an embedded controller circuit 626 coupled to the low-speed bridge 62 via a bus 627. The BIOS 625 is a non-volatile memory used to initialize the hardware of the computer 60 during the power-on process. The embedded controller circuit 626 is an integrated circuit that combines input and output ("I/O") interfaces for low-speed input and output devices 628, such as a serial mouse and a keyboard, as well as perform other low-level hardware functions such as managing the battery, onboard fans and other temperature controls, and LED lighting.

The bus 627 may be implemented using any technology known in the art for data communication between a CPU, a BIOS, and an embedded controller circuit. For example, the bus 627 may be implemented using a Low Pin Count ("LPC") bus, an Industry Standard Architecture ("ISA") bus, or similar technology. The embedded controller circuit 626 is coupled to the I/O devices 628 via one or more buses 629. The buses 629 may be serial buses using the Serial Peripheral Interface ("SPI"), parallel buses, other buses known in the art, or a combination of these, depending on the type of I/O devices 628 coupled to the computer 60.

Embodiments of the concepts, techniques, and structures disclosed herein advantageously solve the problem of authenticating integrated circuits in a manner that resists eavesdropping and reverse engineering attacks. This is due to the dynamic nature of the communication between the integrated circuit and the counterfeit detector, which ensures that the exchange is never identical on each occasion. Consequently, attempts to intercept or replicate the communication would be ineffective, providing a robust layer of security against such attacks.

Moreover, since the blockchain may be hosted on private servers, the IC manufacturer can maintain a comprehensive record of all transactions that seek verification of authenticity. In the event of any authentication failure, the company can precisely pinpoint the time and location of the counterfeit product's occurrence. This centralized oversight not only enhances security measures but also provides valuable insights into the distribution patterns of counterfeit goods, allowing the manufacturer to respond swiftly and effectively to protect its brand integrity and customer trust.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetore-sistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensi-tivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maxi-mum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field expe-rienced by a magnetic field sensing element.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, a current sensor, or a proximity detector. A rotation detector can sense rotation of an object, for example, advance and retreat of magnetic domains of a ring magnet or advance and retreat of gear teeth of a ferromagnetic gear. The term "movement detector" can be used to describe either a rotation detector or a magnetic field sensor that can sense different movement, e.g., linear movement, of a ferromagnetic object, for example, linear movement of magnetic domains of a ring magnet or linear movement of gear teeth of a ferromagnetic gear.

Magnetic field sensors are used in a variety of applica-tions, including, but not limited to an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor is used in combination with a back-bias or other magnet, and a magnetic field sensor that senses a magnetic field density of a magnetic field. The circuits and techniques described herein apply to any mag-netic field sensor capable of detecting a magnetic field.

As used herein, the terms "processor" and "controller" are used to describe elements that perform a function, an opera-tion, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field pro-grammable gate array (FPGA)). Processing can be imple-mented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

In illustrative implementations of the concepts described herein, one or more computers (e.g., integrated circuits, microcontrollers, controllers, microprocessors, processors, field-programmable-gate arrays, personal computers, onboard computers, remote computers, servers, network hosts, or client computers) may be programmed and spe-cially adapted: (1) to perform any computation, calculation, program or algorithm described or implied above; (2) to receive signals indicative of human input; (3) to output signals for controlling transducers for outputting informa-tion in human perceivable format; (4) to process data, to perform computations, to execute any algorithm or software, and (5) to control the read or write of data to and from memory devices. The one or more computers may be connected to each other or to other components in the system either: (a) wirelessly, (b) by wired or fiber optic connection, or (c) by any combination of wired, fiber optic or wireless connections.

In illustrative implementations of the concepts described herein, one or more computers may be programmed to perform any and all computations, calculations, programs and algorithms described or implied above, and any and all functions described in the immediately preceding paragraph. Likewise, in illustrative implementations of the concepts described herein, one or more non-transitory, machine-accessible media may have instructions encoded thereon for one or more computers to perform any and all computations, calculations, programs and algorithms described or implied above, and any and all functions described in the immedi-ately preceding paragraph.

For example, in some cases: (a) a machine-accessible medium may have instructions encoded thereon that specify steps in a software program; and (b) the computer may access the instructions encoded on the machine-accessible medium, in order to determine steps to execute in the software program. In illustrative implementations, the machine-accessible medium may comprise a tangible non-transitory medium. In some cases, the machine-accessible medium may comprise (a) a memory unit or (b) an auxiliary memory storage device. For example, in some cases, while a program is executing, a control unit in a computer may fetch the next coded instruction from memory.

In some cases, one or more computers are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

As used herein, "including" means including without limitation. As used herein, the terms "a" and "an", when modifying a noun, do not imply that only one of the nouns exists. As used herein, unless the context clearly indicates otherwise, "or" means and/or. For example, A or B is true if A is true, or B is true, or both A and B are true. As used herein, "for example", "for instance", "e.g.", and "such as" refer to non-limiting examples that are not exclusive examples. The word "consists" (and variants thereof) are to be give the same meaning as the word "comprises" or "includes" (or variants thereof).

The following definitions and abbreviations are to be used for the interpretation of the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "at least one" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Use of ordinal terms such as "first," "second," "third," etc., in the specification to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. An integrated circuit comprising:
a circuit configured to perform a desired function;
a processor circuit coupled to the circuit configured to perform a desired function;
a data communications circuit coupled to the processor circuit and configured to receive data from, and transmit data to, an electronic authentication device; and
a cryptographic mining circuit coupled to the processor circuit and configured to implement a hashing algorithm;
wherein the processor circuit is configured to respond to receipt, from the electronic authentication device using the data communications circuit, of data including a first cryptographic hash contained in a blockchain, by:
causing the cryptographic mining circuit to produce a second cryptographic hash for inclusion in the blockchain by applying the hashing algorithm to a combination of the first cryptographic hash and a serial number that is unique to the integrated circuit; and
causing the data communications circuit to transmit, to the electronic authentication device, data including the second cryptographic hash, thereby enabling the electronic authentication device to determine, using the blockchain, whether the integrated circuit is authentic.

2. The integrated circuit of claim 1, wherein the circuit configured to perform a desired function comprises a magnetic field sensor.

3. The integrated circuit of claim 1, wherein the processor circuit comprises an application specific integrated circuit, a microprocessor having associated program memory, or a field programmable gate array.

4. The integrated circuit of claim 1, wherein the data communications circuit comprises a network interface controller.

5. The integrated circuit of claim 1, wherein the data communications circuit comprises a loop antenna for providing near field communications between the integrated circuit and the electronic authentication device.

6. The integrated circuit of claim 1, wherein the cryptographic mining circuit is configured to implement the SHA-256 hashing algorithm.

7. The integrated circuit of claim 1, further comprising the electronic authentication device.

8. A device for indicating whether an integrated circuit is authentic, the device comprising:

a processor circuit;

a first data communications circuit coupled to the processor circuit and configured to receive data from, and transmit data to, a server;

a second data communications circuit coupled to the processor circuit and configured to receive data from, and transmit data to, the integrated circuit; and an indicator;

wherein the processor circuit is configured to authenticate the integrated circuit by:

receiving, from a server using the first data communications circuit, a first cryptographic hash contained in a blockchain;

transmitting, to the integrated circuit using the second data communications circuit, an authentication request including the first cryptographic hash;

receiving, from the integrated circuit using the second data communications circuit, an authentication response including a second cryptographic hash of a combination of the first cryptographic hash and a serial number unique to the integrated circuit;

transmitting the second cryptographic hash to the server using the first data communications circuit;

receiving, from the server using the first data communications circuit, data that indicate whether the second cryptographic hash equals an expected cryptographic hash; and causing the indicator to indicate whether the integrated circuit is authentic according to the received data.

9. The device of claim 8, wherein the processor circuit comprises an application specific integrated circuit, a microprocessor having associated program memory, or a field programmable gate array.

10. The device of claim 8, wherein the first data communications circuit or the second data communications circuit comprises a network interface controller.

11. The device of claim 8, wherein the second data communications circuit comprises a loop antenna for providing near field communications between the integrated circuit and the device.

12. The device of claim 8, wherein the first cryptographic hash, the second cryptographic hash, and the expected cryptographic hash each were computed using the SHA-256 hashing algorithm.

13. The device of claim 8, further comprising the integrated circuit, wherein the second data communications circuit comprises a wired data bus.

14. The device of claim 8, wherein the indicator comprises an electronic video display, or an indicator light, or a speaker, or any combination of these.

15. A method of indicating whether an integrated circuit is authentic, the method comprising:

receiving, from a server using a first data communications circuit, a first cryptographic hash contained in a blockchain;

transmitting, to the integrated circuit using a second data communications circuit, an authentication request including the first cryptographic hash;

receiving, from the integrated circuit using the second data communications circuit, an authentication response including a second cryptographic hash of a combination of the first cryptographic hash and a serial number unique to the integrated circuit;

transmitting the second cryptographic hash to the server using the first data communications circuit;

receiving, from the server using the first data communications circuit, data that indicate whether the second cryptographic hash equals an expected cryptographic hash; and indicating whether the integrated circuit is authentic according to the received data.

16. The method of claim 15, wherein receiving the first cryptographic hash comprises receiving using the Internet.

17. The method of claim 15, wherein transmitting the authentication request comprises transmitting using near field communications with the integrated circuit.

18. The method of claim 15, wherein the first cryptographic hash, the second cryptographic hash, and the expected cryptographic hash each were computed using the SHA-256 hashing algorithm.

19. The method of claim 15, wherein indicating comprises indicating using an electronic video display, or an indicator light, or a speaker, or any combination of these.

\* \* \* \* \*